United States Patent [19]

Sobotta

[11] 4,306,782

[45] Dec. 22, 1981

[54] REMOVABLE REMOTE CONTROL UNIT FOR A SLIDE PROJECTOR

[75] Inventor: Reinhard Sobotta, Brunswick, Fed. Rep. of Germany

[73] Assignee: Rollei-Werke Franke & Heidecke GmbH, Brunswick, Fed. Rep. of Germany

[21] Appl. No.: 118,592

[22] Filed: Feb. 4, 1980

[30] Foreign Application Priority Data

Sep. 28, 1979 [EP] European Pat. Off. ........ 79100310.6

[51] Int. Cl.³ .................. G02B 27/20; G03B 21/14
[52] U.S. Cl. ................................. 353/119; 353/42; 353/103
[58] Field of Search ............... 353/42, 103, 112, 113, 353/116, 117, 119

[56] References Cited

U.S. PATENT DOCUMENTS

| | | | |
|---|---|---|---|
| 3,019,704 | 2/1962 | Zillmer | 353/101 |
| 3,078,763 | 2/1963 | McCammon | 353/42 |
| 3,176,579 | 4/1965 | Zillmer . | |
| 3,221,598 | 12/1965 | Hall | 353/103 |

FOREIGN PATENT DOCUMENTS

| | | |
|---|---|---|
| 1108466 | 6/1961 | Fed. Rep. of Germany . |
| 1226678 | 10/1966 | Fed. Rep. of Germany . |
| 2106603 | 8/1972 | Fed. Rep. of Germany . |
| 2511941 | 9/1976 | Fed. Rep. of Germany . |
| 967550 | 8/1964 | United Kingdom ............... 353/103 |

*Primary Examiner*—John W. Shepperd
*Attorney, Agent, or Firm*—Schwartz, Jeffery, Schwaab, Mack, Blumenthal & Koch

[57] ABSTRACT

A slide projector having a remote control unit which is removable engageable with the slide projector. When the control unit is disengaged from the projector, it is removably engageable with an accessory which can be a further control or indicating device. Electrical contacts on the control unit electrically communicate with contacts in an aperture located on the projector and also a similar aperture located on the accessory. Thus, during remote control operations, an additional function or indication can easily be added to the control unit.

12 Claims, 6 Drawing Figures

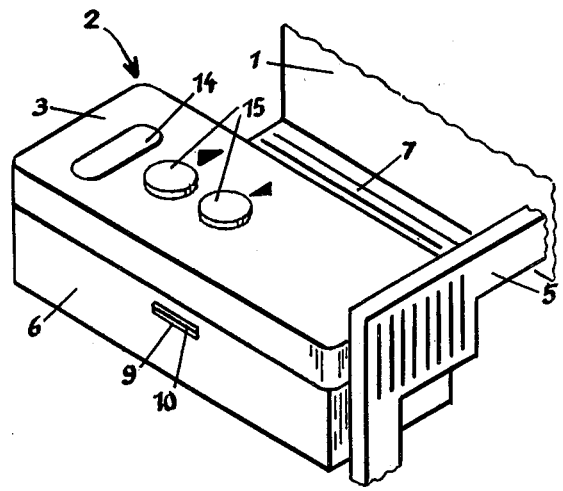
FIG. 1
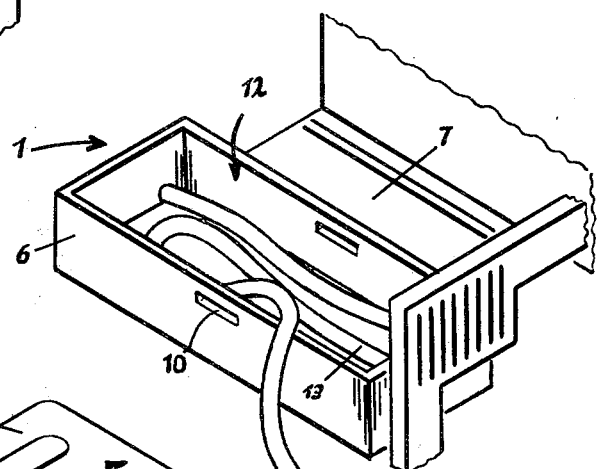
FIG. 2
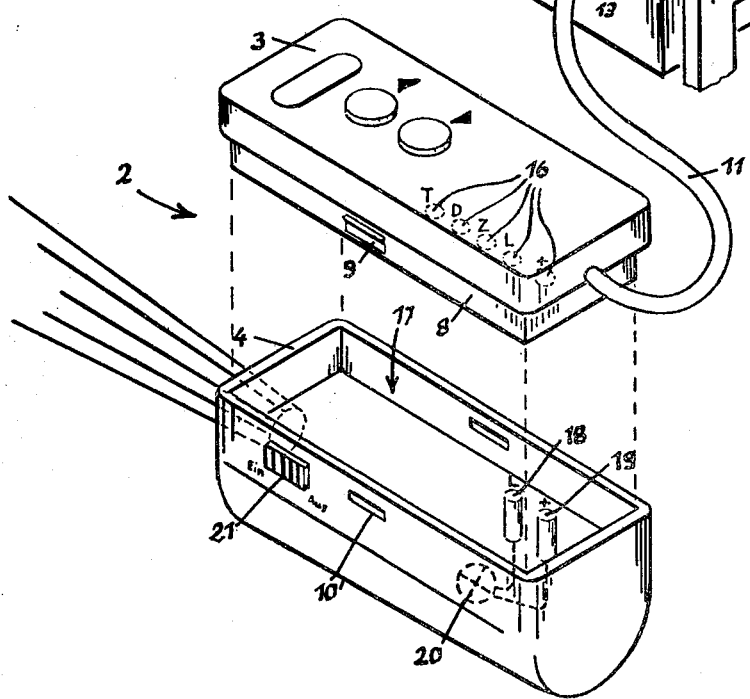

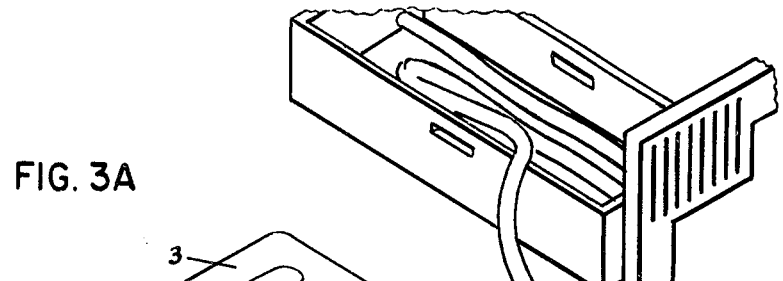
FIG. 3A
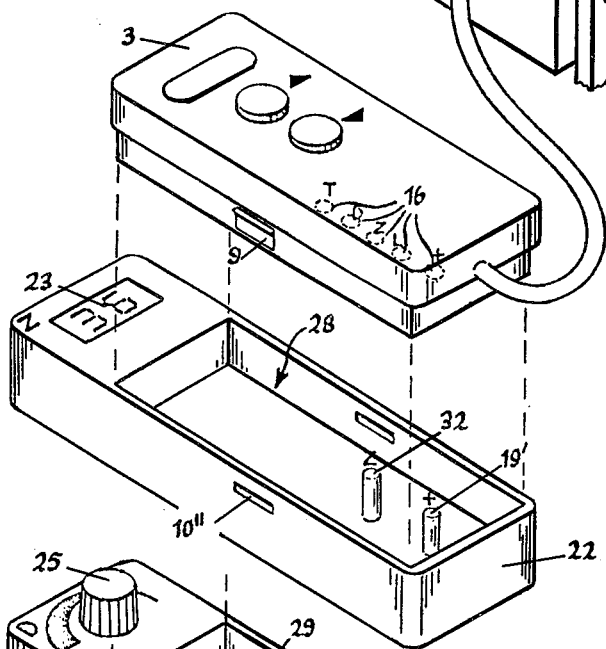
FIG. 3B
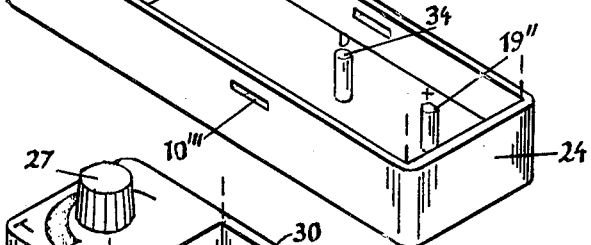
FIG. 3C
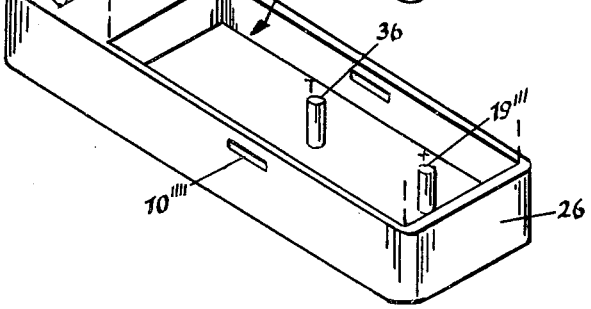

REMOVABLE REMOTE CONTROL UNIT FOR A SLIDE PROJECTOR

BACKGROUND OF THE INVENTION

The present invention relates generally to a slide projector and more specifically, to a slide projecting having a remote control unit.

A device for the remote operation of slide projectors has been disclosed in West German Offenlegungsschrift No. 25 11 941. The remote device has a housing detachably fixed on the projector with an upper housing part closed on all sides to accommodate the switching means for slide changing and lens focusing and also a time switch for slide changing and a light arrow device combined with a viewing window and, open at the back, a lower housing part for accommodating the coiled connecting cable. This control or switch unit can be attached to the projector or removed from it and used as a remote control for the projector. In addition, it makes it possible to project an illuminated arrow as a pointer and furthermore, via a timer, makes it possible to adjust the dwell times for automatic slide changing.

Such a control unit is relatively large and cumbersome particularly due to the possibility of additional optional single slide facility and due to the number of control functions contained on the remote unit. In addition, a buyer of such a slide projector always has to buy all the additional auxiliary functions of the remote control unit even if he uses them rarely or not at all. On the other hand, it has been found that for special demonstration purposes even the auxiliary functions offered by the existing remote control units are inadequate.

SUMMARY OF THE INVENTION

It is an object of the present invention to resolve the above and other problems by providing a remote control unit which is detachable from the slide projector and which in addition to the main functions of advancing and reversing the slide magazine and focusing the lens, can provide all the other possible auxiliary functions which may be required for showing slides, in the form of individual accessory parts with the relevant control functions, adapted for attachment to the remote control housing part.

The above and other objects are achieved by providing a slide projector with a control unit for operating the projector which can be detached from the slide projector and used as a remote control unit. Additionally, when being used as a remote control unit, various accessories or combinations of accessories can be attached to the remote control unit as desired. The projector body has an aperture into which a portion of the control unit can be removably fixed. When the control unit is removed from the projector, it can be removably fixed in apertures on the various accessories for combined operations. When fixed on an accessory, the control unit has electrical contacts which are in electrical communication with electrical contacts on the accessory to provide electrical communication between the slide projector and the accessory. In a preferred embodiment, several accessories are removably fixed to each other and/or the control unit and all have electrical contacts which are in electrical communication with the slide projector.

BRIEF DESCRIPTION OF THE DRAWINGS

A more complete appreciation of the invention and the attendant advantages thereof will be more clearly understood by reference to the following drawings, wherein:

FIG. 1 is a perspective view of a slide projector according to the invention with an incorporated control housing part;

FIG. 2 is a perspective view of the slide projector shown in FIG. 1 with a remote control device in an exploded view, wherein a light pointer unit has been fitted as an accessory to the control housing part which has been removed from the slide projector;

FIGS. 3a-3c are perspective views showing the alignment orientation of possible accessory parts such as the counter unit, the dimmer unit and the timer switch.

DETAILED DESCRIPTION OF THE PREFERRED EMBODIMENTS

Figure 4:
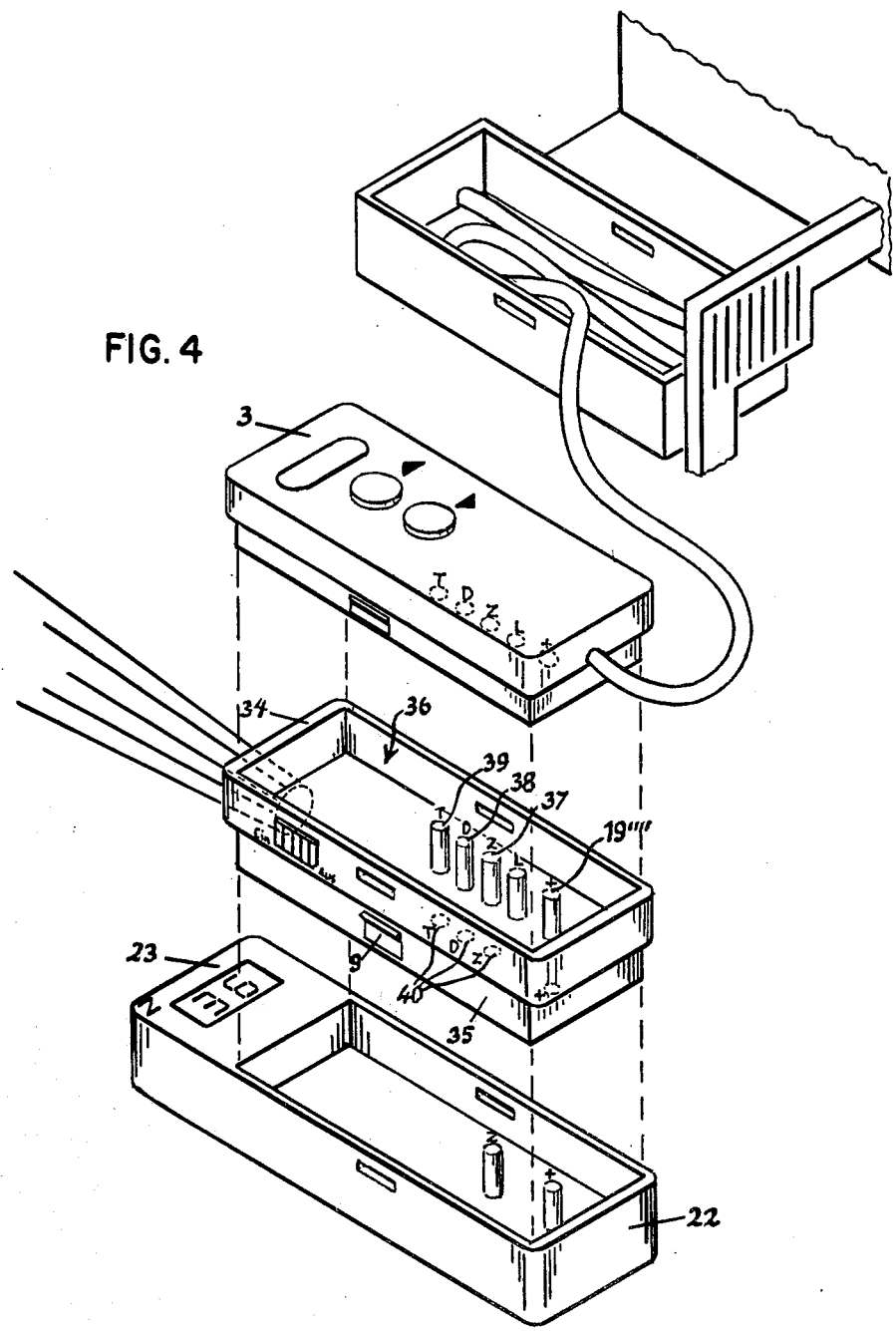
FIG. 4 is a perspective view of a further embodiment of the light pointer accessory shown in FIG. 2 on which a further accessory part in the form of a counter unit has been fitted.

The invention relates to a slide projector with an operating device which is detachable from the slide projector for use as a remote control and having switch members for slide change, lens focusing, a light pointer and/or a time switch for the slide change, said switching members being connected via a supply cable to the slide projector, with an operating housing part to accommodate the switching members for slide change and lens focusing and with holding means for separable attachment of the control housing part on the slide projector.

Such operating devices make it possible for the person showing slides to operate the slide projector according to the prevailing conditions either at the projector itself or also at a certain distance from the projector. In this case, the slide projector does not have any separate control device which would be left inoperative and useless on the slide projector if the latter is being remotely controlled. The retention of such remote control devices on the slide projector therefore serves at the same time to prepare the projector for immediate starting up at the projector.

The advantages achieved by the present invention reside substantially in that the control housing part with the main control functions can be kept so small that it can be easily mounted anywhere on the slide projector housing and not protrude from the outer contours of the slide projector. Even if the control housing part is connected to an accessory such as for example the light pointer device, the handiness of the remote control unit is not lost, so that single-handed operation is still possible. Furthermore, the costs of manufacturing the slide projector without any accessories are considerably reduced.

Additionally, apart from the supports for holding the control housing part for attachment on the slide projector no additional mechanical supporting facilities on the control housing are required for attachment of accessory parts to form a common specific remote control unit. The same supporting elements by which the control housing is supported on the slide projector can also be used for supporting accessory parts. The possibility of choice whereby specific demonstration functions can be provided on the remote control unit finally widens the circle of prospective users and so enhances the usefulness of the remote control device.

Referring now to the drawings wherein like reference characters designate like parts throughout the several views, FIG. 1 shows a slide projector 1, a remote control unit 2, the control housing part 3 and the light pointer accessory 4. The control housing upper portion 3 is recessed into the wall 6 of the magazine track 7 alongside the slide gripper 5. Located more or less in the middle of the control unit in the lower portion 8 of the housing is a ratchet tongue 9 which engages a corresponding slot 10 in the wall 6 of the slide projector 1 or a corresponding slot 10′ in the wall of the light pointer accessory 4 (as seen in FIG. 2).

The control housing part 3 is connected to the slide projector 1 via a supply lead 11 through the aperture 12 formed in the wall 6 and the storage space 13 located below it. On the upper face of the control housing portion 3 are the main control elements, the slide changer 14 and the lens focusing system 15. On the lower portion it has contact sockets (shown by hidden lines) which connect with the supply lead 11. The contact sockets 16 consist of the plus terminal (+) and the relevant minus terminal (L, Z, D, T) for the relevant accessory parts.

In the same manner as wall 6 of the slide projector 1, the light pointer accessory 4 has in its upper portion an aperture 17 into which the lower portion 8 of the control unit 2 can be inserted. Centering is achieved by means of the stepped housing contours of the control housing 3. Electrical connection to the slide projector is via the contact pin 18 (L) disposed in the aperture 17 and the contact pin 19 (+). Disposed in the lower portion of the light pointer accessory 4 is an incandescent bulb 20 (indicated by hidden lines) which is connected to the contact pins 18, 19. By corresponding optical means, the light pointer emits a beam from the end face of the light pointer accessory 4. On the side of the top portion of the housing is the on/off switch 21.

The electrical contact pins 18 and 19 used for the power supply lie safely within the aperture 17 and serve solely to provide a means of electrical contact and they do not mechanically support the light pointer accessory 4. The centering and supporting of control housing part 3 and light pointer accessory 4 are produced by the stepped housing contours of the lower portion of the control housing part 3 and the aperture 17 as well as the ratchet tongue 9 and the ratchet slot 10′. In the connected condition, the remote control device 2 includes a handy light pointer device which is supplied with current by the slide projector 1.

FIGS. 3a–3c show the alignment of such accessories as the counter unit 22 with an LED display 23, the dimmer device 24 for the projection lamp (not shown) with the adjusting potentiometer 25 and a time switch 26 for automatic slide changing the period of which is varied by adjusting potentiometer 27.

The accessories 22, 24, 26 likewise have housing apertures 28, 29, 30 for receiving the stepped lower portions 8 of the control housing part 3 therein. The plus terminal contact pins 19′, 19″ and 19‴ as well as the staggered contact pins 32 (Z), 34 (D) and 36 (T) cooperate with the corresponding contact sockets 16 (Z, D, L) in the bottom of the control housing portion 3. Centering or alignment of the accessories 22, 24 and 26 is accomplished by means of the housing apertures 28, 29 and 30 and they are supported by the ratchet tongue 9 engaging ratchet slots 10″, 10‴ or 10⁗, respectively.

FIG. 4 shows an example of an embodiment in which a second accessory part can be attached to a first accessory part. In the present case, the light pointer unit is so constructed that its lower housing portion 35 can be inserted into the aperture of the second accessory part 22 having a counter unit and the LED display 23. For this purpose, accessory part 34 has in its housing aperture 36 additional contact pins 37 (Z), 38 (D), and 39 (T) and the associated contact sockets 40 (Z,D,T) (shown by broken lines), so that the supply of power for further accessory parts is guaranteed.

In the case of this embodiment of the invention, it is possible, in addition to the light pointer device 34, to use any additional accessory part desired, e.g. the counter unit 22, the dimmer device 24 or the time switch 26 for slide changing. The usefulness of the remote control unit as a whole is thus substantially improved.

Although the invention has been described relative to specific embodiments thereof, it is not so limited and modifications and variations thereof will be readily apparent to those of ordinary skill in the art in light of the above teachings. For example, other accessory parts such as those for single slide viewing, can be separately fitted to the control housing, the light pointer device or other units. It is, therefore, to be understood that, within the scope of the appended claims, the invention may be practiced otherwise than as specifically described.

The embodiments of the invention in which an exclusive property or privilege is claimed are defined as follows:

1. A slide projector with a control unit which can be detached from the projector and used as a remote control unit, said control unit comprising switching means for slide changing and lens focusing, said switching means electrically connected to the slide projector by means of a supply cable, said control unit comprising a control housing having upper and lower portions, said upper portion for accommodating said switching means for slide changing and lens focusing; said lower portion including means for removably fixing said control unit to said slide projector, said projector including an aperture, said lower portion of said control unit comprising a stepped bottom portion insertable into said aperture and removably fixed therein by said fixing means, said control unit further including electrical contacts on said control unit lower portion, said electrical contacts in electrical communication with said cable; said slide projector further including an accessory, said accessory comprising:

means for removably fixing said control unit to said accessory;

further control and/or indicator means; and electrical contacts in electrical communication with said accessory control and/or indicator means and in communication with said control unit electrical contacts when said control unit is removably fixed to said accessory.

2. A slide projector according to claim 1, wherein said accessory has upper and lower portions, said accessory upper portion including an aperture, said control unit lower portion capable of being removably fixed in said accessory aperture, said control unit further including electrical contacts on said control unit lower portion.

3. A slide projector according to claim 2, wherein said means for removably fixing said control unit to said accessory and said means for removably fixing said control unit to said projector, comprise flexible ratchet tongues on said lower portion of said control unit, corresponding slots in said aperture of said slide projector and said accessory part, said ratchet tongue cooperating with said slot to retain said control unit in said aperture.

4. A slide projector according to claim 3, wherein said accessory is comprised of a light pointer device.

5. A slide projector according to claim 3, wherein said accessory comprises a LED display, and means for counting the number of slides shown by said projector and activating said LED display to indicate said number.

6. A slide projector according to claim 3, wherein said accessory is a means for dimming said projection lamp.

7. A slide projector according to claim 3, wherein said accessory comprises timer means for providing an electrical signal for activating a slide changing mechanism in said slide projector periodically.

8. A slide projector according to claim 4, wherein said light pointer device comprises a stepped lower portion with electrical contacts mounted thereon, said slide projector further including an additional accessory having at least an upper portion including an aperture, said light pointer device lower portion removably insertable into said further accessory aperture, said further accessory including electrical contacts in said aperture, said further accessory electrical contacts being in electrical communication with said electrical contacts on said light pointer device lower portion when said light pointer device lower portion is inserted in said aperture.

9. A slide projector according to claim 8, wherein said further accessory comprises a LED display, and means for counting the number of slides shown by said projector and activating said LED display to indicate said number.

10. A slide projector according to claim 8, wherein said further accessory comprises a means for dimming said projector lamp.

11. A slide projector according to claim 8, wherein said further accessory comprises timer means for providing an electrical signal for activating a slide changing mechanism in said slide projector periodically.

12. A slide projector according to claim 8, wherein said light pointer device further includes on said lower portion, means for removably fixing said further accessory part on said lower portion.

* * * * *